United States Patent
Benavides

(10) Patent No.: US 8,244,989 B2
(45) Date of Patent: Aug. 14, 2012

(54) SECURE ERASURE OF A TARGET DIGITAL FILE INCLUDING USE OF REPLACEMENT DATA FROM USED SPACE

(75) Inventor: Avelino Andretti Benavides, Athlone (IE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 277 days.

(21) Appl. No.: 12/598,043

(22) PCT Filed: May 2, 2007

(86) PCT No.: PCT/EP2007/054264
§ 371 (c)(1),
(2), (4) Date: Oct. 29, 2009

(87) PCT Pub. No.: WO2008/135078
PCT Pub. Date: Nov. 13, 2008

(65) Prior Publication Data
US 2010/0138619 A1    Jun. 3, 2010

(51) Int. Cl.
*G06F 12/00* (2006.01)
(52) U.S. Cl. ........ 711/152; 711/154; 711/159; 711/170; 707/609; 707/813; 707/822; 726/26; 360/60
(58) Field of Classification Search .............. 711/166, 711/159, 111, 152, 154, 170; 360/60; 707/609, 707/813, 822; 726/26
See application file for complete search history.

(56) References Cited

U.S. PATENT DOCUMENTS

| | | | |
|---|---|---|---|
| 5,265,159 A | 11/1993 | Kung | |
| 5,991,778 A * | 11/1999 | Starek et al. ............... | 1/1 |
| 6,212,600 B1 * | 4/2001 | Friedman et al. ............ | 711/112 |
| 6,731,447 B2 * | 5/2004 | Bunker et al. ............... | 360/60 |
| 2002/0181134 A1 | 12/2002 | Bunker et al. | |
| 2006/0117136 A1 | 6/2006 | Tran et al. | |
| 2006/0117153 A1 | 6/2006 | Tran et al. | |
| 2007/0156998 A1 * | 7/2007 | Gorobets .................... | 711/170 |

FOREIGN PATENT DOCUMENTS

| | | |
|---|---|---|
| CA | 2388117 A1 | 12/2002 |
| EP | 0575765 A1 | 12/1993 |
| JP | 6095949 A | 4/1994 |
| WO | 99/17233 A | 4/1999 |

OTHER PUBLICATIONS

PCT International Search Reported, mailed Dec. 27, 2007, in connection with International Application No. PCT/EP2007/054264.
Anonymous: "Nuker for Windows Product Details" Internet Citation, Jul. 5, 1999, XP002268895. Retrieved from the Internet: URL:http://web.archive.org/web/20000916023052/www.geniousa.com/nuker_product_details.htm>.

\* cited by examiner

*Primary Examiner* — Hong Kim
(74) *Attorney, Agent, or Firm* — Potomac Patent Group PLLC

(57) ABSTRACT

One or more target files are securely erased from a host storage medium such as a disk by overwriting the target files not just with "O's," "1's" and/or random data, but also (or instead) by overwriting them with portions of other, selected, innocuous files found on the same medium. By booting the host using a secondary, preferably external mechanism, before the host operating system is allowed to load, logging of file accesses and process execution by the host OS is circumvented. Post-replacement fragmentation and defragmentation may also be used to further reduce the detectability of the erasure, and the success of the process may be evaluated using statistical analysis.

15 Claims, 5 Drawing Sheets

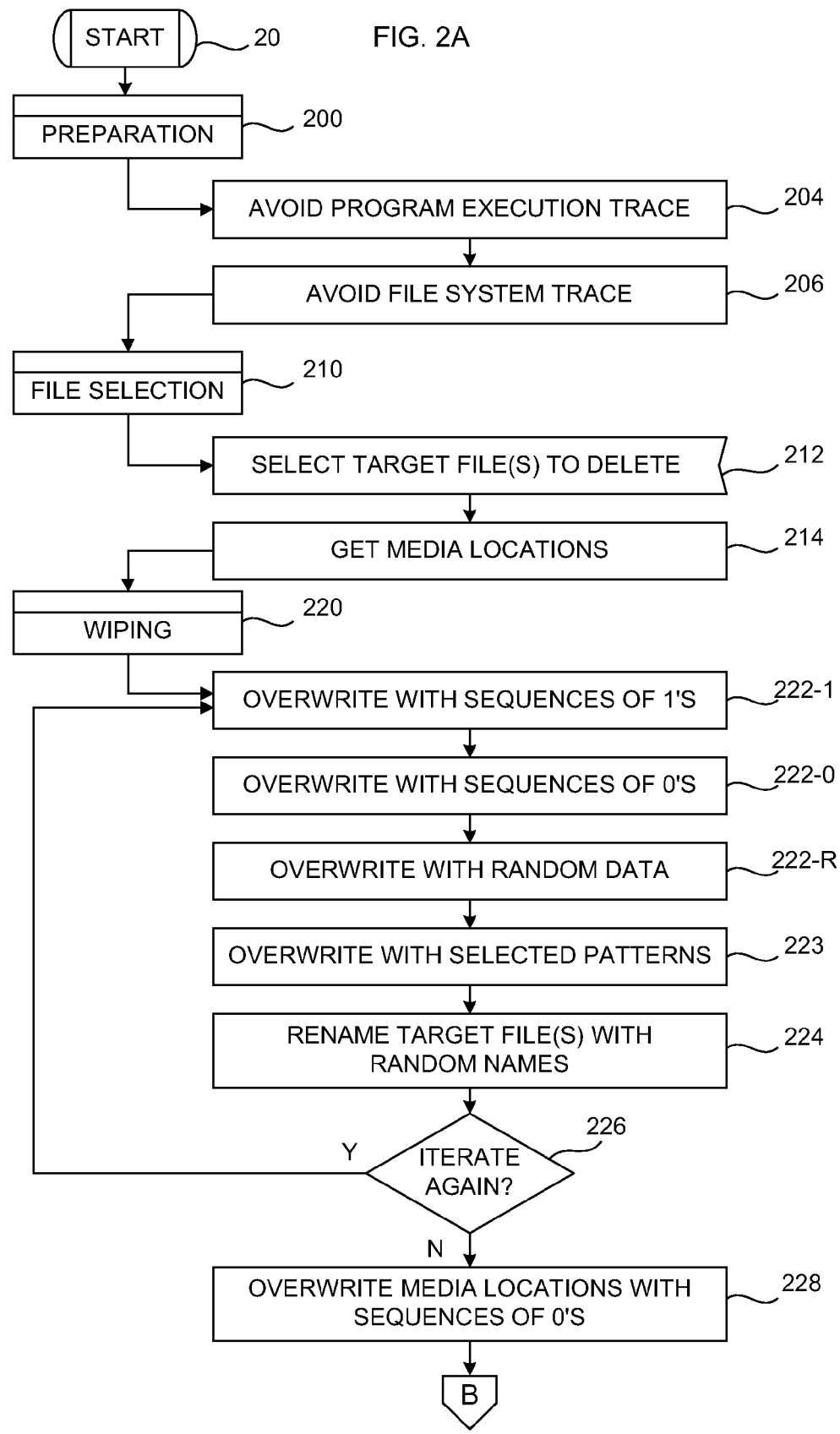

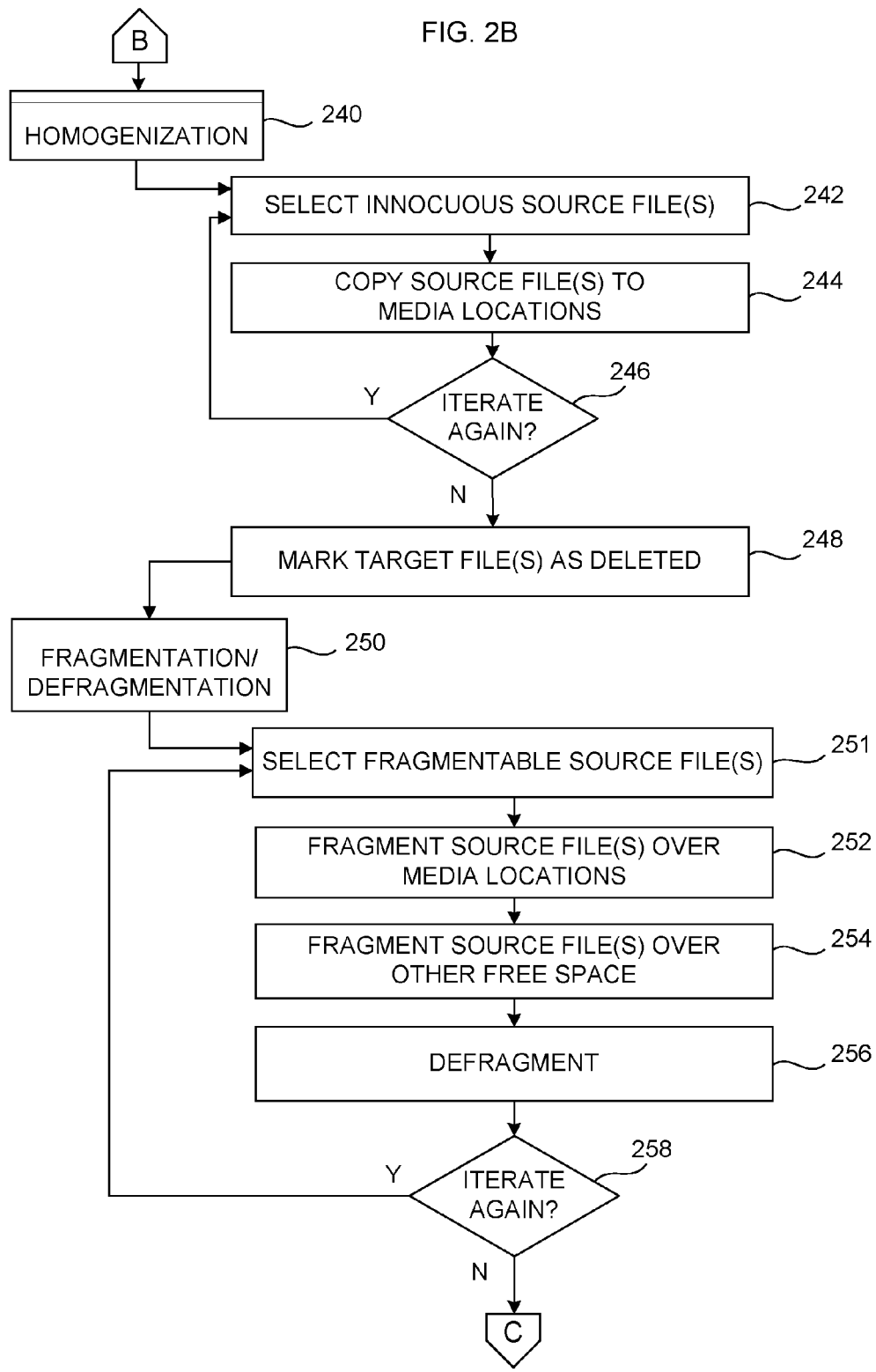

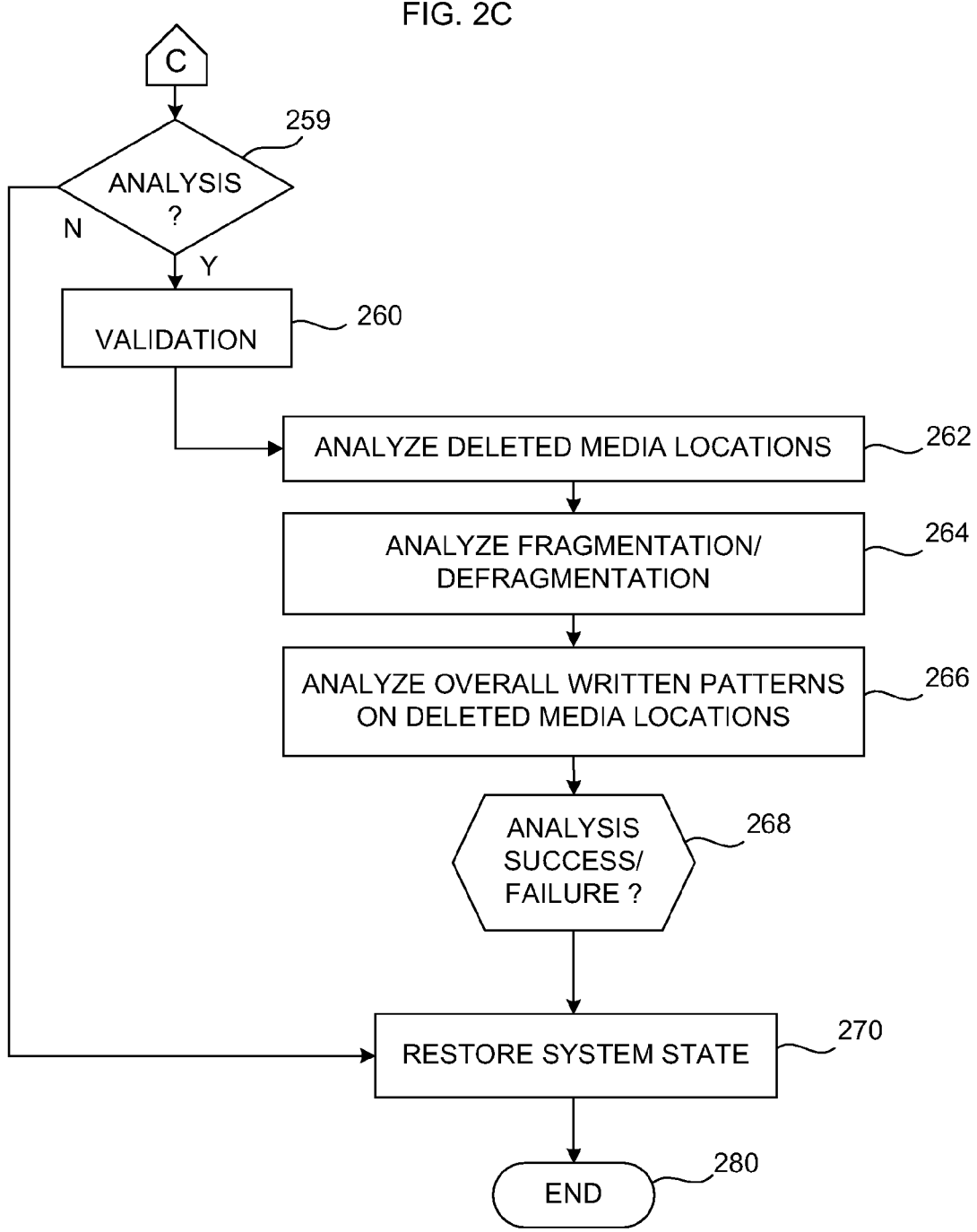

SECURE ERASURE OF A TARGET DIGITAL FILE INCLUDING USE OF REPLACEMENT DATA FROM USED SPACE

TECHNICAL FIELD

This invention relates to a method and various system implementations for erasing information stored in a persistent information storage medium such as a disk in conjunction with some form of computer system.

BACKGROUND

Even when "permanently" deleting digital or electronic files from a persistent information storage medium such as a computer hard disk, the computer's operating system (OS) will generally delete only the reference to the file(s) in, for example, some kind of file allocation table, but leave the data intact on the medium itself. As time goes on, the pages, sectors or other storage units that were deleted may be overwritten, but at least for some time an opponent can use this persistence to access the information using some form of forensic attack. In the undelete forensic attack, the opponent scans the hard drive for known digital file patterns and, with some luck, if he finds them, then it is a trivial procedure to recover the data that still remains unchanged in the medium. Indeed, this is also a part of what "data recovery" involves in the context of non-malicious, inadvertent loss of access to data.

According to many known methods for erasing or "sanitizing" a medium, the locations in the medium where the file(s) was located are overwritten with zeros, ones, and/or random/encrypted bit patterns a given number of times. Depending on the type of medium and the number of times the file is overwritten, the likelihood of success of data recovery using a simple undelete forensic attack is reduced. One such known overwriting method for secure deletion is the Gutmann Technique (see Peter Gutmann, "Secure Deletion of Data from Magnetic and Solid-State Memory," Sixth USENIX Security Symposium Proceedings, San Jose, Calif., Jul. 22-25, 1996, accessible at http://www.cs.auckland.ac.nz/~pgut001/pubs/secure_del.html.

Another widely used method for secure deletion is the United States Department of Defense (DoD) Standard DoD 5220.22-M, which is the designation for the procedure described in the "National Industrial Security Program Operating Manual (NISPOM)." DoD 5220.22-M is used by, for example, not only by the DoD, but also by the United States Department of Energy, Nuclear Regulatory Commission, and Central Intelligence Agency.

According to the DoD 5220.22-M, somewhat varying procedures are prescribed for different information storage media, such as for a non-removable rigid disk as opposed to an Electronically Erasable PROM (EEPROM), Magnetic Bubble Memory, Static Random Access Memory (SRAM), even CRT monitors, to name just a few of the many different media mentioned in the "5220.22-M Clearing and Sanitization Matrix." Depending on the medium, physical procedures such as degaussing and ultraviolet erasure are used in addition to repeated overwriting. Common to the various procedures, however, is the overwriting of addressable locations with a character, then its complement, then a random character, followed by a verification step.

Relatively sophisticated forensic techniques using magnetic and electron microscopy, such as Magnetic Force Microscopy (MFM) and Scanning Tunneling Microscopy (STM), are typically required to retrieve such overwritten data, but it is possible nevertheless. The effectiveness of these sophisticated forensic attacks is undermined, however, by the number of times and careful selection of patterns for the overwriting phase. Given enough effort, it is usually possible to make the recovery of the "erased" data more and more difficult until it is prohibitively expensive for an attacker to recover the data.

Even assuming "perfect" erasure of data from a medium using these known techniques, it is often still possible to prove at least the existence of the data and the intention to destroy it. In the common case where the erased data is (was) organized in some notion of a "file," with modern journaling file systems, portions of the file may have not been deleted properly and an audit trail is generated. Statistical analysis of the contents of the medium may therefore reveal "wiped" spots that have a different pattern from typical free or used space. In other words, a file may have been erased with a random pattern but if the erased file is in a free address space that has a non-random bit pattern (which usually does), then the random bit pattern itself will stand out from its surroundings.

Consider a simple, "natural language" analogy and assume that a document has the following "Lorem ipsum" (essentially arbitrary Latin text used as text filler) "paragraphs":

Mauris ultricies. Nam est ligula, ultricies in, tincidunt non, interdum vitae, augue. Lorem ipsum dolor sit amet, consectetuer adipiscing elit. Gbs;kdHtskjf tejk17fdksobneoi7 lujhoiw73-6uiv.

Suspendisse potenti. In dui ante, consectetuer in, vestibulum consectetuer, viverra quis, felis. Integer tortor metus, accumsan sed, hendrerit quis, tristique eget, magna.

Even without understanding the words of the original text, most readers would realize that something has been changed or replaced or deleted or filled in at the end of the first paragraph because the character pattern, although random, stands out—even though the letters in a normal text can come in an essentially arbitrary string of words, there is still a non-random structure that can be established through experience or statistical analysis. For example, in a large enough, arbitrary English-language text, the letter "e" usually occurs the most often, followed in frequency by "t" "o" "i", etc.; some character strings almost never occur (long consonant or vowel strings, for example), and so on. A simple example of this would be a text (.txt or .doc) file, which will typically contain the digital representations (for example, ASCII) of the underlying alphanumeric characters. The byte representing "e" will thus usually occur most frequently, followed in frequency by the bytes for "t," "o," "i,", etc.

Most readers would not find it in any way unusual, however, that there is a blank line between the paragraphs, because this is a typical way for "free" and "unused" space to appear. Non-random, digitally encoded information stored on a disk exhibits analogous properties.

FIG. 1 illustrates this phenomenon in a more abstract, storage-related context, namely, how a magnetic media surface might look like after an operation using even the most "secure" prior art erasure methods found in the prior art. In FIG. 1, Typical Free Space (TFS), Used Space (US), and Atypical Free Space (TFS) are illustrated.

In this example, an Atypical Free Space fragment is located in a region that, otherwise, contains typical Used Space. The statistical anomaly that this gives rise to may provide a hint to a possible attacker that, given the right time and circumstances, he might get illicit access to the information in this fragment, which might be sensitive information. At the very least, the attacker may be able to recognize that something happened in the region containing the Used Space. An attacker that finds no evidence of the existence or deletion of sensitive information is more likely to leave the target alone, however. With no reason to suspect the presence of any potentially recoverable sensitive information, the opponent will have no reason to pursue an attack on the target.

Not all attacks involve illegal activity. Another type of "attack" could be a forensic analysis, by a court or state authority, or by a private party such as during the "discovery" phase of some litigation the United States. If it can be seen that a file has been deleted and securely erased, for example, then this itself could indicate wrongdoing such as tampering with evidence. Even if the original file was no proof of wrongdoing, a secure erasure trail could be subjectively used to undermine the legal confidence and reputation of the party.

Even if there is no sign of erasure of the medium itself, features of many modern operating systems still retain information about which processes they have scheduled for execution. If an attacker sees that a file-erasure program has been executed, this fact alone may be undesirable evidence leading to further inquiry or attack. It is therefore also necessary to remove the traces of a secure erase operation, but prior art solutions fail to do so.

The following references are representative of prior art mechanisms for "secure" erasure of data and files that exhibit some or all of the shortcomings mentioned above: Published U.S. Patent Application Nos. US2006117153, US2006117136, US2002181134; U.S. Pat. Nos. 6,731,447, 5,265,159; European Patent No. EP0575765; Canadian Patent No. CA2388117; and Japanese Patent No. JP6095949.

What is needed is therefore a way to more securely erase and "sanitize" at least parts of an information medium. Preferably, this should be done in such a way that even the act of erasure is much less detectable than in the prior art.

SUMMARY

The invention provides a method and related system implementation for securely erasing data from a computer-readable host storage medium, for example, a disk, in a host computer system, which has a host operating system (OS), and in which the host storage medium stores separately read/writable files in at least one used space. According to the invention, at least one of the files is selected as a target file for secure erasure. A set of replacement data, preferably all or portions of innocuous source files (for example, having a type commonly chosen for deletion from the host computer system), are selected from the used space of the host storage medium. The target file(s) on the host storage medium are then replaced with the replacement data; since the replaced portions will resemble the source files, the space of replaced and source files will have a "homogenized" structure much less detectable than what prior art systems can achieve. In particular, homogenization according to the invention will reduce the likelihood that an attacker will even have reason to suspect that data of interest to him was ever present, which in turn will reduce the likelihood that he will even initiate a full-scale attack on the system.

In systems in which the operating system maintains a file system for organizing the read/writable files and for logging process execution or file accesses execution, the invention provides for circumventing the host OS logging of process execution or file accesses by booting the host computer using a secondary mechanism, such as a secondary OS before the host OS is able to boot and by selecting the target file, selecting the set of replacement data, and replacing the target file under the control of the secondary mechanism. The secondary mechanism is preferably stored on a secondary computer-readable storage medium that is external to the host computer system and is run from the secondary medium when the secondary medium is operatively connected to the host computer system. Using this embodiment of the invention, the host OS's audit, journaling, register-tracking, etc., systems will not have to be manually deactivated because they will not have been loaded and activated in the first place. The invention also envisions incorporation directly into a host OS, however, and in these cases, manual deactivation may be desirable, although suitable modification of the host OS would allow for automatic deactivation as well.

Before overwriting the target file(s) location(s) with source file data, the target file(s) are preferably first wiped using a conventional data erasure routine.

To further reduce detectability, the invention provides for fragmenting selected ones of the source files over locations on the storage medium containing the target file and then defragmenting these source file fragments. Preferably, only a subset of the source files are fragmented over locations on the storage medium containing the target file, with the rest being fragmented over contiguous free space of the storage medium.

The invention also provides for optional validation of the success of its secure erasure procedures. In this aspect of the invention, a statistical profile of selected characteristics of the locations of the replaced target files on the storage medium is computed, both pre- and post-fragmentation, the profiles are compared and successful secure erasure is indicated if the profiles agree to within a predetermined threshold value and failure otherwise.

BRIEF DESCRIPTION OF THE DRAWINGS

FIGS. 2A-C together form a flow chart outlining the method according to the invention.

DETAILED DESCRIPTION

Figure 1:
FIG. 1 illustrates how the prior art may leave a detectable indication that a portion of a storage medium has been erased.

The invention involves secure and at least substantially undetectable erasure of information from a medium in a computer system. For the sake of clarity and ease of explanation, it is assumed here that a "file" (singular or plural) is to be securely erased from a "disk." This is of course merely by way of example. For ease of explanation, the term "file" as used here is any set of digital data that is identified, organized, and deleted as a unit in storage by an operating system (OS); storage of the file will often, but need not be, contiguous, and could even extend over more than one storage device. This includes what one would normally think, that is, files such as "text.doc" that appear separately in any form of file allocation table, as well as data "blocks" such as pages, etc., in short, any part of the space of the storage medium/media that bears some physical manifestation of information that is to be securely erased, including the entire space. Note that the "information" that the invention securely obscures is not just the pattern of "1's" and "0+s" that constituted the target file, that is, the file to be erased, but also any residual or replacement pattern that might evidence that this original digital information was erased in the first place.

Similarly, "disk" is used here solely by way of example, and should therefore be interpreted to mean any storage medium, for example, an erasable and re-writable magnetic, optical or bubble disk, or an EEPROM device, or a tape, or any type of memory device, including flash memory devices, using any technology, including SRAM, DRAM, etc., whether volatile or non-volatile, that displays any degree of persistence. Similarly, unless otherwise stated, the use of the singular form "medium" is meant to cover a system of multiple media as well, whether of the same or mixed types.

In broad terms, the general idea behind this invention is to obfuscate, in a number of ways, secure deletion of some target information (here, broadly, "file"). If any audit trail and statistical analysis of the disk fail to indicate any attempt to erase a file securely, then, the likelihood of any attack at all will itself be reduced. The main technique through which the invention achieves its improvements is to cause the storage space freed by a secure erasure process to resemble a typical free space, preferably with no trace left on record (such as in an execution log) indicating that a file-erasure routine was executed and a file was securely erased.

FIGS. 2A-C together are a flow chart outlining the method according to the invention. Once the invention is started (step 20), the method includes several main phases: 1) preparation (200); 2) file selection (210); 3) wiping (220); 4) homogenization of freed space (240); 5) fragmentation/defragmentation (250); and 6) validation (260). These phases, some of which may be optional in some implementations of the invention, are described individually.

Preparation

A tool, program or device performing secure deletion according to the invention should preferably leave no trace of its execution or even existence. It should therefore preferably not be installed in the host computer system, that is, the computer in which file(s) to be deleted reside. This creates a difficulty in systems whose host (resident, "default") operating system produces an audit trace for program execution and file access.

The invention uses different options to circumvent the host computer system's program execution and file system trace (Steps 204, 206). One option is simply to turn off the audit trace routine (including any other routines that create and leave any indication of the existence and execution of processes or file accesses) before loading and executing the secure deletion program that embodies the method according to the invention. If this trace routine is accessible to a user, then the user could just turn it off and then load the deletion program and start its execution.

To enable more general use of the invention, however, such as in conjunction with commodity computer systems, some other method will typically be needed to circumvent the host OS's audit or process execution tracing mechanism. According to the invention, the preferred way to do this is to execute the secure deletion program before the host OS is loaded. In the preferred embodiment of the invention, at boot time, the host machine is booted from an alternative source, that is, from a source other than the host computer's own storage. In this case, a secondary OS (which should be read to mean any executable body of code that implements the invention) is provided on or via an external medium, removable or fixed, such as a CD-ROM, DVD, USB/flash drive, secondary disk (either free-standing or possibly under the control of another system such as a computer dedicated to implementing and applying the invention to other computers), network drive, etc. The invention is not limited to any particular secondary OS, although Linux is preferred for its flexibility and transparency. Just a couple other examples include BSD and even Windows Pre-Installed Environments.

Booting the (or, in this case, a secondary) OS from an external medium is a well-known procedure; indeed, many computers come with a separate "boot disk" to help recover from a serious "crash" that may have affected the ability of the resident OS to boot. In the case of a common PC, for example, it will by default boot first from floppy, then from any detected CD/DVD and finally the hard drive, so inserting a CD/DVD before the boot process begins will circumvent the host OS "naturally." Depending on the host OS, the user may first need to manually change the BIOS settings (preferably in the BIOS itself, or in a BIOS-like setup-utility) to boot from the external medium. Then the user prepares the medium (such as by inserting a CD-ROM into the CD drive, connecting to a network drive, etc.) and boots into the CD (or other medium). The external medium should then be bootable and contain an image of the secondary OS, which will load the invention's erasure routine and any auxiliary and/or third-party routines it may need.

One advantage of letting the erasure routine according to the invention reside on an external medium, and to boot the target computer system from this medium, is that the host OS's audit, journaling, register-tracking, etc., systems will not have to be manually deactivated because they will not have been loaded and activated in the first place. Execution is then directed into the code defining the file-selection, erasure, homogenization and validation routines of the invention.

Note that these routines need not necessarily reside on the same medium as the secondary OS as long as the correct execution entry point is known to the secondary OS. Moreover, some of the procedures used by the invention can be carried out by invoking known third-party software modules; consequently, the various routines defining the invention do not necessarily have to be on a single medium at all, even though this may be the most convenient implementation where the invention should be as self-contained and easy to use as possible.

Note further that a host OS could also be "circumvented" by physically removing the target disk and carrying out the routines according to the invention by mounting it on a separate computer that implements this invention. This need not always be a "drastic" procedure, since the invention could also be used to securely erase files, for example, from common external back-up disk drives as well as from an internal, main host storage disk.

The invention would also be valuable in other, more malicious instances where the disk is removed from the host computer, or the entire computer—disk and all—is no longer under the control of the user who wrote sensitive data on the disk: As just one example, the BBC has reported (see http://news.bbc.co.uk/2/hi/business/4790293.stm "UK bank details sold in Nigeria") that sensitive financial data found on the hard disks of discarded computers are being retrieved and used to further crimes involving identity theft. Using the invention, not only would erased data be more secure, but the identify thieves would be dissuaded from mounting a data recovery effort because the very act of previous erasure (which would hint at potentially recoverable valuable information) would be effectively concealed. Finding only an "uninteresting" disk from a particular source, the attackers will be more inclined to focus on some other source in the future.

As long as it is possible to undetectably disable the host OS's tracking routines, as well as all indication that these routines have ever been disabled, it would also be possible to operate this invention without bypassing the host OS; this would in most cases require that the host OS be specially modified to incorporate the invention. Of course, even the presence of such a feature in the OS of a user's host computer might give rise to suspicion. In some cases this may be irrelevant, such as where the host computer system is normally used in an environment where secure erasure can be an expected part of normal operations anyway, such as in classified or otherwise "secretive" organizations, in organizations that handle secure commercial transactions (for example, on-line credit card purchases or banking transactions), etc.

File Selection

Once boot-time execution of the host/target computer has been redirected into the external medium/media (or otherwise disabled), the files to be deleted must be identified and selected (Step 212). This may be done in different ways, depending on the degree of transparency of the file system used in the host/target computer and on how much user involvement is needed or desired.

Selecting files for secure erasure will generally involve accessing the host computer's (in particular, host OS's) file system unless the external system or its user knows the physical locations (tracks, sectors, etc.) of the information to be erased on the target disk. According to one embodiment of the invention, depending on the transparency of the host OS, the erasure routine itself could include its own module for accessing the host computer's file system structures. Such a customized implementation may prove difficult, however, where the host OS uses a proprietary file system such as NTFS. Fortunately, there already exists known software, such as drivers and routines, that is sufficiently stable and that can access even such proprietary file systems as NTFS and FAT 32 for read/write/move and defragmentation operations. Of course, most Linux-based OS's are more transparent, with file system structures that are accessible by existing routines. In short, any known or customized software module may be included in a given implementation of the invention to access the target computer's file system.

Accessing the file system will typically involve extracting the name(s) of file(s) from the suitable table(s). The erasure routine preferably takes as arguments the complete file names to be deleted, which may be obtained by examining (if present) the disk's master boot record. Given a file name, known software modules (which may be different for each file system supported) will obtain a list of the physical disk's locations that contain the file data, including directory and shadow copies entries for the file name.

In the preferred embodiment of the invention, if files to be erased have not already been specified in some other manner, a list of files is then presented to the user, using any type of interface, who can then select for secure erasure any of the listed file(s) using any known method. By the nature of a typical file system, selecting file names (or equivalent designators) will generally also specify the location(s) in the physical and/or address space of the target medium (Step 214).

Wiping

In the preferred embodiment of the invention, the next step in the process of secure erasure is to "wipe" the selected file(s) (Phase 220), which may be done using any known method. For example, DoD 5220.22-M or the Gutmann algorithm can be applied. Note that this wiping phase is optional, but will typically increase the level of security using quickly executed, known routines—the unique homogenization phase according to the invention provides greater security, but will often be computationally more burdensome. As FIG. 2A illustrates, the wiping phase will typically include overwriting with sequences of "1's", "0's" and random or pseudo-random data (Steps 222-0, 222-1, 222-R), in any chosen order. The target locations are then preferably also overwritten with selected non-random patterns (step 223, a procedure known in the prior art), which will help defeat possible Run Length-Limited (RLL) or Modified Frequency Modulation (MoFM) magnetic encodings.

At some point in the secure erase procedure according to the invention, random but likely, that is, plausible, names are then preferably also assigned to the wiped files (Step 224) and any directory and system entries to the file or files are cleared. The tool must be smart enough to produce random, but likely file names. One source of such names could be existing file names, with other permitted alphanumeric characters appended to them to produce file names that are also valid for the given file system. Then the tool will preferably rename the target files a number of times, to conceal the original file names.

This wiping procedure (or some similar known wiping procedure) may be iterated (Step 226). As is known, the number of iterations of the wiping procedure (and other iterations described below) will normally depend on the type of medium to be erased, how long the target data have resided on the medium, and other factors such as the coercivity of the medium, etc. The number of iterations in each case may either be predetermined using normal design methods, or this could be set by the user. The step of creating random file names is preferably also iterated so as to better conceal the original names of the wiped files.

In systems where formatted typical free space has a known pattern, such as all "0's", the locations of the wiped files are then preferably overwritten with this pattern (Step 228) so as to look like a "typical" clean, formatted, free space.

Homogenization of Freed Space

At this point the recovery of the original file should be extremely difficult; however, statistical (or other) analysis of the free space may still lead an attacker to conjecture that some form of secure file deletion has taken place. The invention provides a method to thwart such a statistical analysis by "homogenizing" the freed space (Phase 240), that is, the invention makes the medium homogeneous with respect to clean and used free space.

Accordingly, the invention's erasure routine preferably randomly selects a list of innocuous files (Step 242) as source files. Here, "innocuous" files are those whose contents may be duplicated without suspicion, and will typically be files of a type normally created and modified by users. Files such as page, system, encrypted, compressed, hidden, and executable files should therefore be avoided. These source files are preferably smaller than the total of the target locations, but large enough to have common file patterns. The erasure routine according to the invention will usually be able to identify suitable source files by inspection of those listed by the file system.

As just one example, assume that the host OS is some variant of Windows 2000 or Windows XP. Files that have extensions such as *.doc, *.xls, *.ppt, *.ost, *.txt, *.xml, *.htm*, *.gif, *.jpg, *.wav, *.avi, etc., and files found in directories such as "Documents and Settings," "Internet Browser Cache," "Temporary File Folders," "Recycle Bin," etc., will usually be suitable as innocuous source files, whereas those with extensions such as *.exe, *.sys, *.dll, or registry files, program files, read-only files, system files, hidden files, swap files, etc., or those found in directories such as % WINDIR %, % PROGRAMFILES %, root directories, service pack temporary directories, swap directories, etc., should generally be avoided. Of course if the target OS is different, for example, Linux or Solaris or Vista, then the erasure routine will be adjusted accordingly.

When suitable source files have been identified, the erasure routine according to the invention (either itself or using a known, third-party software module) preferably scans the disk to retrieve the file sizes, creation times, last times of access and modification, etc., to create a statistical picture of the drive. This scan is optional, to be used in conjunction with the validation sub-process described below.

Once suitable source files have been selected, the erasure routine according to the invention preferably copies their contents (Step 244) a number (pre-set or user-set) of times (iteration step 246) into the locations where the target files resided. The whole space of the locations targeted should be covered to avoid tell-tale erasure remnants, which could compromise the entire erasure operation; in some cases, this may require appending several source files.

These homogenization steps will ensure that the recently freed space will appear to a statistical analysis like regular used free space, thereby hiding the secure delete operation.

Fragmentation/Defragmentation

Especially if the target medium is magnetic, advanced forensic techniques like MFM and STM might, however, still be capable of identifying for how long data has been resident. A sophisticated attacker might thus be able to detect that a particular section of the medium has had an abnormal amount of activity recently. This could in turn provide a hint to a suspicious attacker that some kind of cover-up activity is taking place.

To make this possibility look far-fetched in such scenario, the level of activity on several parts of the medium should look high as well. Such level of activity is normal when defragmenting a magnetic medium volume, since file copying and deleting take place all over. Still, some file systems perform automatic defragmentation in normal I/O operations. The secure erase tool, program or device according to the preferred embodiment of the invention provides a way to confound even such analysis in a fragmentation/defragmentation phase (250).

First, the homogenized target file(s) are marked as deleted (Step 248), which frees up space. Then, a series of fragmentation/defragmentation steps is iterated:

Fragmentable source files (see above) are identified and selected (Step 251). Here, "fragmentable" files are those that are large enough in size that they occupy more than one logical cluster in the medium. Files such as page, system, hidden and on use should not be fragmented.

Next, these selected source files are fragmented over the target medium locations (Step 252). Although permissible, it is generally not necessary and actually not preferable that all the deleted sections must be overwritten at this point, but rather a random sample corresponding to about 60% is believed to be a good enough measure in most practical cases.

The rest (for example, the remaining 40%) of the source files are then fragmented over contiguous free space (Step 254) that it is not part of the deleted sections. This space preferably should be free used space, but this is not required. The amount of free space will vary depending on the size of the medium, free space available and size of the deleted sections. Such space should be enough to mask the excess activity of the deleted sections.

The erasure mechanism according to the invention then defragments the whole of the source files (Step 256). For each subsequent iteration (decision Step 258) of this fragmentation/defragmentation procedure, a different set of source files should preferably be selected so the activity is spread out over the used portion of the medium.

The selection algorithms for the fragmentable files should preferably not be random since, otherwise, a random selection algorithm may appear suspicious to an activity analysis. Instead, the algorithm should be based on patterns of normal use so that an activity analysis will at most reveal normal, albeit heavy use.

Validation

This optional (decision Step 259) validation phase (260) is especially advantageous during development and testing of implementations of the invention, but it may also be included to increase the confidence level that the target files have indeed been securely and undetectably erased to within a statistically acceptable level of certainty. In a sense, the validation step involves the invention acting as would a particularly sophisticated attacker.

In broad terms, the validation phase comprises analyzing the wiped, homogenized, deleted/deleted, homogenized, medium sections (Step 262) to make sure they have no random data. The fragmentation/defragmentation process is then similarly analyzed (Step 264) to make sure it reflects the results of a "normal" completion of such a process.

Then, all patterns written to the deleted sections are analyzed (Step 266). Although the final state of the deleted section should resemble an innocuous file, the patterns' written distribution should be close to a normal, that is, typical distribution. What follows is an example of a suitable statistical validation procedure.

The statistical profile of the deleted files preferably evaluates and creates the following:

Mean and standard deviation of file size, modification, access and creation times. These data may vary from system to system—for example, the last access time exists in NTFS and by default is updated for Windows 2000 and Windows XP, but not for Microsoft Vista. Therefore each version should be targeted accordingly.

Average contents of empty typical free space that is not zeroed out, that is, other normally deleted files.

A catalog of files such that their modification, access and creation times fall within the standard deviation and another catalog of those whose times fall to the most recent time, within a certain percentile. This percentile may be a user-configurable setting, such as by selecting only the top 80% above the mean.

A catalog of freed space (space previously occupied by other files, but now marked as free) locations.

A catalog of free, pristine space (space never before occupied by data). The size of this catalog may be user-configurable, for example, 10 Mbytes of pristine space for homogenization.

These steps are preferably carried out both after the homogenization phase, and also after the fragmentation/defragmentation sub-process, so that their results can be compared. The purpose of computing these statistical profiles is that, after the defragmentation step, the different parameters of the new (post-erasure) statistical profile should still resemble the old (pre-erasure) one to within a certain threshold value. This threshold value may be a user-configurable setting; for example, the statistical values for the post-erasure drive free space must be within 1% of the pre-erasure drive free space.

The validation sub-process will often be neither particularly fast nor trivial. It could therefore be scaled down to examine only statistically representative portions of the disk and then fragment/copy/move/defragment these portions to speed up the process.

If all the above tests are passed (Decision step 268), then the secure erasure process can be considered successful. The result (success/failure) is then preferably indicated to the user in any conventional way, such as by a suitable message on the user's monitor.

The system should then be restored (Step 270) to the same audit and execution level that it had before commencing the procedures according to the invention, so that the system will operate normally. At this point, whatever external medium that was used to initiate the erasure procedures according to the invention can be removed and the computer can (if desired) be allowed to boot using its own host OS. The erasure procedure will have reached its end point (280).

System Implementation

Figure 3:
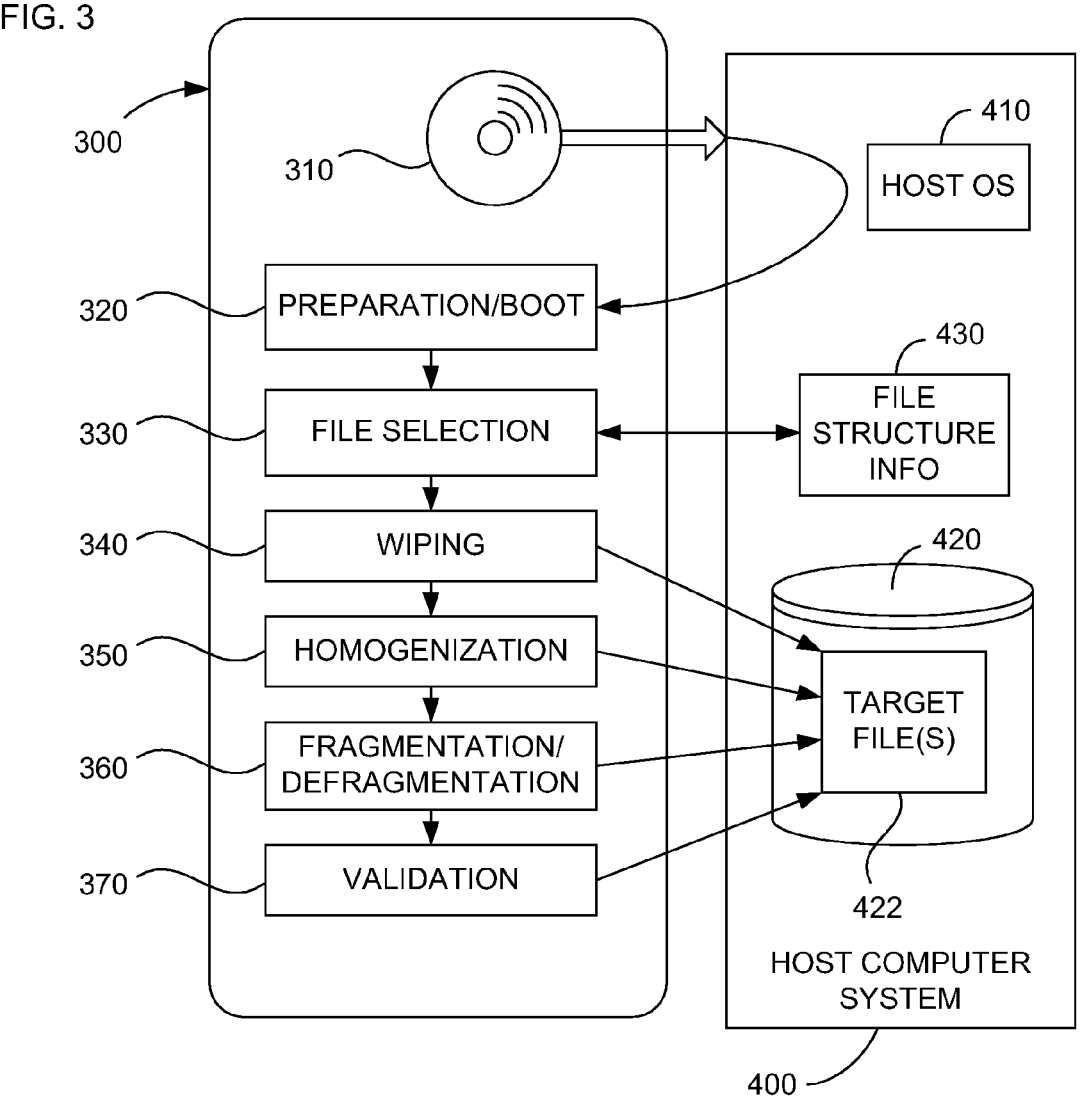
FIG. 3 illustrates the main hardware and software components that are used in the invention.

The various hardware and software components that are used in or operated on by the invention have been mentioned previously. Nonetheless, these are illustrated in FIG. 3:

The various components (required or optional) that a user would want to run are labelled generally within border 300. As is mentioned above, not all of the components of the invention need necessarily be embodied on the same computer-readable storage medium; moreover, any or all of the various software modules/sub-processes of the invention may either be encoded separately and linked, or may be simply sub-routines of a larger body of code.

The external medium 310 is inserted or connected to the host computer system 400 in such a way that the host OS 410 does not boot; instead, the boot routine according to the invention 320 is invoked and begins to run and perform the preparation phase of the process of securely erasing target file(s) 422 from the target medium or media 420. Software modules 320, 330, 340, 350, 360, and 370 are then executed to carry out the other phases of the secure erasure operation according to the invention, namely, respectively, file preparation (phase 200); file selection (phase 210); wiping (phase 220); homogenization of freed space (phase 240); fragmentation/defragmentation (phase 250); and validation (phase 260). As mentioned above, some of these modules may be known, third-party software modules, such as those that access and extract the host's file structure tables 430.

Illustration of Advantages of the Invention

Although the advantages of the invention should by now already be clear to skilled system-level programmers, an example is provided here to concretely illustrate the benefits of obfuscating even the existence of a securely erased file.

Assume that Alice wants to securely delete file Alpha so that an opponent Bob will not misuse the contents of such file, for example to harm Alice and gain financially. Assume further that Bob can get access to Alice's computer's magnetic storage medium (disk) without her knowledge, but not before Alice has securely deleted the file using this invention.

The first thing Bob will probably do is to look for the file Alpha in the list of available files. Since the file is deleted, this attempt will fail. The next thing Bob will attempt is to retrieve the file from the list of deleted files (for example, in some version of a Recycle Bin). Bob may be able to recover files Beta and Gamma which are of no interest to him. At this point, assume that Bob suspects that a secure erasure may have taken place. If Bob finds evidence that the file was erased he will double his efforts to get at Alice's disk at a vulnerable time or further analyze the disk to discover at least portions of Alpha.

Bob will analyze the disk searching for three things: Statistically random data, which hints at the existence of encrypted information, but does not provide positive proof; traces of secure erase utilities, such as a utility that is known to run, for example, a DoD 5220.22-M process; and statistically atypical free space, which will very strongly indicate that a secure erase operation has taken place. Assuming Alice has used this invention, Bob will find no random data that he can connect to encrypted information and no traces of secure erase utilities.

Next, Bob will analyze the deleted and free portions of the disk to look for data that appears random, or magnetic signals that are statistically different from regular free space. Thanks to the invention, all the deleted and free space will look normal, so Bob disregards Alice as a possible handler of the file Alpha.

Because Alice has deleted the Alpha file using secure deletion according to the invention, all traces of the erase operation are also removed. What Bob will have recovered as files Beta and Gamma will in reality simply be the product of the last overwrite step of the erasure of Alpha. None of the files in the system, deleted or available, can be used to retrieve or give clues of the existence of Alpha in any way, as they are unrelated.

The invention claimed is:

1. A method for securely erasing data from a computer-readable host storage medium in a host computer system which has a host operating system, and in which the host storage medium stores separately read/writable files in at least one used space, the method comprising:
    selecting at least one of the files as a target file for secure erasure;
    selecting a set of replacement data from the used space of the host storage medium that is representative of at least one source file in the used space;
    replacing the target file on the host storage medium with the replacement data;
    fragmenting selected ones of the source files over locations on the storage medium containing the target file; and, thereafter
    defragmenting the source file fragments.

2. A method as in claim 1, in which the host operating system (OS) maintains a file system for organizing the read/writable files, and that logs process execution or file accesses execution, the method further comprising:
    circumventing the host OS logging of process execution or file accesses by booting the host computer using a secondary mechanism before the host OS is able to boot and by selecting the target file, selecting the set of replacement data, and replacing the target file under the control of the secondary mechanism.

3. The method of claim 2, wherein the secondary mechanism is stored on a secondary computer-readable storage medium that is external to the host computer system and is run from the secondary medium when the secondary medium is operatively connected to the host computer system.

4. The method of claim 3, wherein the secondary mechanism is a secondary operating system.

5. The method of claim 1, further comprising, before replacing the target file on the storage medium with the replacement data, wiping the target file using a conventional data erasure routine.

6. The method of claim 1, comprising:
    fragmenting only a subset of the source files over locations on the storage medium containing the target file; and
    fragmenting remaining source files over contiguous free space of the storage medium.

7. The method of claim 1, comprising computing a statistical profile of selected characteristics of the locations of the replaced target files on the storage medium, both pre- and post-fragmentation, comparing the profiles, and indicating successful secure erasure if the profiles agree to within a predetermined threshold value and failure otherwise.

8. The method of claim 1, further comprising selecting each source file as one having a type commonly chosen for deletion from the host computer system.

9. The method of claim 1, wherein the computer-readable host storage medium is a disk.

10. A computer-operated mechanism for securely erasing data from a computer-readable host storage medium in a host computer system, which has a host operating system, and in which the host storage medium stores separately read/writable files in at least one used space, the computer-operated mechanism comprising:

a secondary computer-readable storage medium storing instructions executable by the host computer system, including:

a file selection module that selects at least one of the files as a target file for secure erasure;

a homogenization module that selects a set of replacement data from the used space of the host storage medium that is representative of at least one source file in the used space, and that replaces the target file on the host storage medium with the replacement data; and a fragmentation/defragmentation module comprising computer-executable instructions for fragmenting selected ones of the source files over locations on the storage medium containing the target file; and for thereafter defragmenting the source files.

11. The mechanism of claim 10, in which the host operating system (OS) maintains a file system for organizing the read/writable files, and that logs process execution or file accesses execution, further comprising:

a preparation and boot module stored on the secondary medium and comprising computer-executable instructions for circumventing the host OS logging of process execution or file accesses by booting the host computer before the host OS is able to boot and by selecting the target file.

12. The mechanism of claim 11, wherein the secondary mechanism is stored on a secondary computer-readable storage medium that is external to the host computer system and is run from the secondary medium when the secondary medium is operatively connected to the host computer system.

13. The mechanism of claim 12, wherein the secondary mechanism is a secondary operating system.

14. The mechanism of claim 10, further comprising a validation module comprising computer-executable instructions for computing a statistical profile of selected characteristics of the locations of the replaced target files on the storage medium, both pre- and post-fragmentation, for comparing the profiles, and for indicating successful secure erasure if the profiles correspond to within a predetermined threshold value and failure otherwise.

15. The mechanism of claim 10, wherein the computer-readable host storage medium is a disk.

* * * * *

UNITED STATES PATENT AND TRADEMARK OFFICE
CERTIFICATE OF CORRECTION

| | | |
|---|---|---|
| PATENT NO. | : 8,244,989 B2 | Page 1 of 1 |
| APPLICATION NO. | : 12/598043 | |
| DATED | : August 14, 2012 | |
| INVENTOR(S) | : Benavides | |

It is certified that error appears in the above-identified patent and that said Letters Patent is hereby corrected as shown below:

On the title page, item (57), under "ABSTRACT", in Column 2, Line 3, delete ""O's,"" and insert -- "0's," --, therefor.

In Column 4, Line 60, delete ""0+s"" and insert -- 0's --, therefor.

Signed and Sealed this
Fourth Day of December, 2012

David J. Kappos
*Director of the United States Patent and Trademark Office*